US012775785B2

(12) United States Patent
Che

(10) Patent No.: US 12,775,785 B2
(45) Date of Patent: Oct. 27, 2026

(54) PUBLISHING METHOD FOR MULTIMEDIA CONTENT, DEVICE, AND MEDIUM

(71) Applicant: Beijing Zitiao Network Technology Co., Ltd., Beijing (CN)

(72) Inventor: Wanli Che, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 323 days.

(21) Appl. No.: 18/711,506

(22) PCT Filed: Dec. 12, 2022

(86) PCT No.: PCT/CN2022/138296
§ 371 (c)(1),
(2) Date: May 17, 2024

(87) PCT Pub. No.: WO2023/116480
PCT Pub. Date: Jun. 29, 2023

(65) Prior Publication Data

US 2025/0021751 A1 Jan. 16, 2025

(30) Foreign Application Priority Data

Dec. 24, 2021 (CN) ........................ 202111602444.9

(51) Int. Cl.
*G06F 40/186* (2020.01)
*G06F 3/04886* (2022.01)
*G06Q 50/18* (2012.01)

(52) U.S. Cl.
CPC ........ *G06F 40/186* (2020.01); *G06F 3/04886* (2013.01); *G06Q 50/184* (2013.01)

(58) Field of Classification Search
CPC .................................................... G06F 40/186
See application file for complete search history.

(56) References Cited

U.S. PATENT DOCUMENTS

2018/0137137 A1 5/2018 Jin et al.
2021/0203665 A1 7/2021 Calegari et al.

FOREIGN PATENT DOCUMENTS

CN 106294297 A 1/2017
CN 108156503 A 6/2018
(Continued)

OTHER PUBLICATIONS

International Patent Application No. PCT/CN2022/138296; Int'l Written Opinion and Search Report; dated Feb. 24, 2023; 7 pages.
(Continued)

*Primary Examiner* — James J Debrow
(74) *Attorney, Agent, or Firm* — BakerHostetler

(57) ABSTRACT

A publishing method and apparatus for multimedia content, a device, a medium and a program product are provided. The publishing method for the multimedia content includes: displaying a target multimedia content template on a display page; in response to a copywriting display operation, displaying at least two preset copywritings corresponding to the target multimedia content template; in response to a triggering operation on a target copywriting in the preset copywriting, adding the target copywriting to the target multimedia content template; and in response to a publishing operation, generating target multimedia content using the target copywriting and publishing the target multimedia content.

19 Claims, 10 Drawing Sheets

(56) References Cited

FOREIGN PATENT DOCUMENTS

| | | | | | |
|---|---|---|---|---|---|
| CN | 108694210 | A | | 10/2018 | |
| CN | 108924441 | A | | 11/2018 | |
| CN | 111104545 | A | | 5/2020 | |
| CN | 111144076 | A | | 5/2020 | |
| CN | 111522614 | A | | 8/2020 | |
| CN | 112689189 | A | | 4/2021 | |
| CN | 113157972 | A | | 7/2021 | |
| CN | 113473182 | A | | 10/2021 | |
| CN | 113589991 | A | | 11/2021 | |
| CN | 201111389285 | | * | 11/2021 | ............. H04N 5/262 |
| CN | 114363686 | A | | 4/2022 | |
| CN | 114363686 | B | | 1/2024 | |
| JP | 2021192831 | A | * | 11/2021 | ............. G06Q 30/02 |

OTHER PUBLICATIONS

China Patent Application No. 202111602444.9; First Office Action; dated Mar. 4, 2023; 19 pages.

China Patent Application No. 202111602444.9; Second Office Action; dated May 20, 2023; 20 pages.

* cited by examiner

PUBLISHING METHOD FOR MULTIMEDIA CONTENT, DEVICE, AND MEDIUM

CROSS-REFERENCE TO RELATED APPLICATION

The present disclosure is a U.S. national stage application of International Patent Application No. PCT/CN2022/138296, filed on Dec. 12, 2022, which claims priority of the Chinese Patent Application No. 202111602444.9, filed on Dec. 24, 2021, the entire disclosures of which are incorporated herein by reference as part of the present application.

TECHNICAL FIELD

The present disclosure relate to the field of computer technology, and for example, to a publishing method and apparatus for multimedia content, a device, a medium and a program product.

BACKGROUND

The user can use a template provided by the platform for multimedia content authoring. However, the way of authoring using templates is difficult to author the multimedia content, which is not conducive for the user to quickly author the multimedia content.

SUMMARY

The present disclosure provide a publishing method and apparatus for multimedia content, a device, a medium and a program product, to reduce authoring difficulty when using templates for multimedia content authoring.

In a first aspect, the present disclosure provides a publishing method for multimedia content, including:

displaying a target multimedia content template on a display page;

in response to a copywriting display operation, displaying at least two preset copywritings corresponding to the target multimedia content template;

in response to a triggering operation on a target copywriting in the preset copywriting, adding the target copywriting to the target multimedia content template; and in response to a publishing operation, generating target multimedia content using the target copywriting and publishing the target multimedia content.

In a second aspect, the present disclosure further provides a publishing apparatus for multimedia content, including:

a template display module, configured to display a target multimedia content template on a display page;

a first copywriting display module, configured to, in response to a copywriting display operation, display at least two preset copywritings corresponding to the target multimedia content template;

a copywriting adding module, configured to, in response to a triggering operation on a target copywriting in the preset copywriting, add the target copywriting to the target multimedia content template; and a multimedia content publishing module, configured to, in response to a publishing operation, generate target multimedia content using the target copywriting and publish the target multimedia content.

In a third aspect, the present disclosure further provides an electronic device, including:

one or more processors;

a memory, configured to store one or more programs;

the one or more programs, upon being executed by the one or more processors, cause the one or more processors to implement the publishing method for multimedia content according to an embodiment of the present disclosure.

In a fourth aspect, the present disclosure further provides a computer-readable storage medium storing computer programs, the programs, upon being executed by a processor, implement the above publishing method for multimedia content.

In a fifth aspect, the present disclosure further provides a computer program product, the computer program product, upon being executed by a computer, causes the computer to implement the above publishing method for multimedia content.

DETAILED DESCRIPTION

Figure 1:
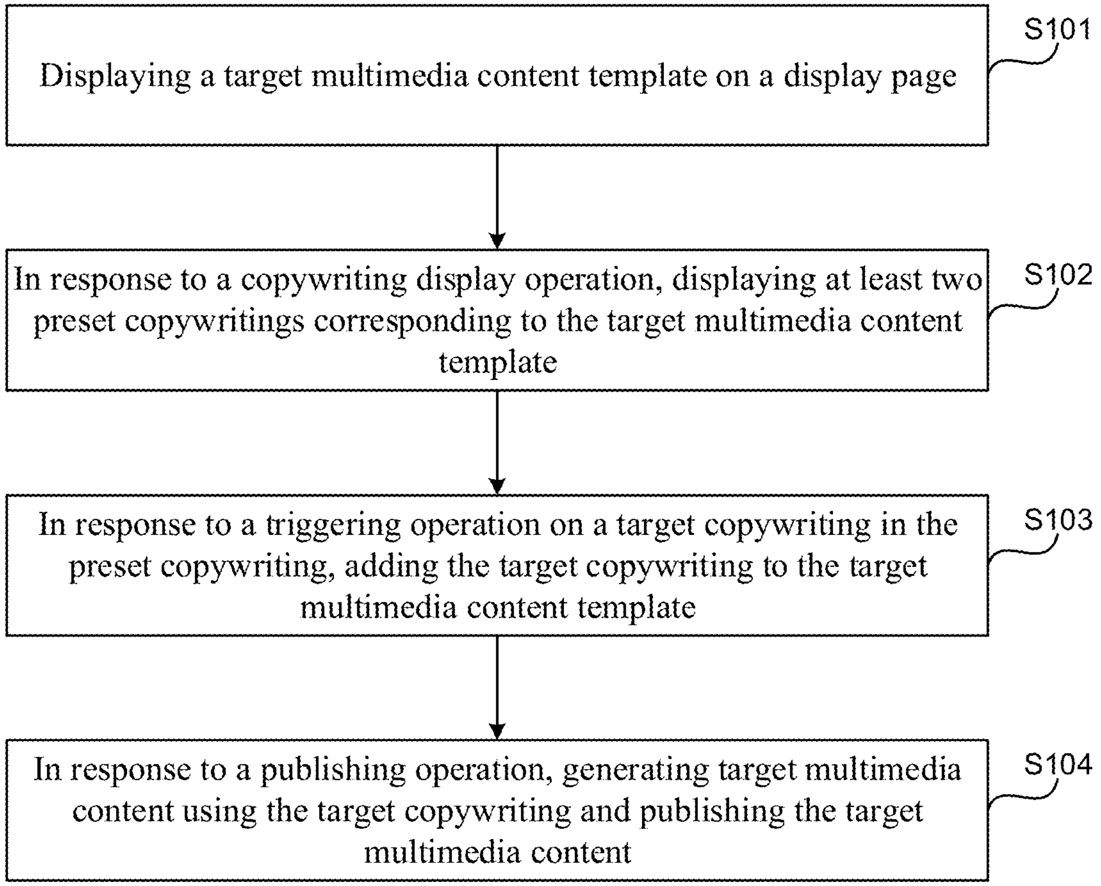
FIG. 1 is a flowchart diagram of a publishing method for multimedia content according to an embodiment of the present disclosure.

Embodiments of the present disclosure are described in detail below with reference to the drawings. Although some embodiments of the present disclosure are shown in the drawings, the present disclosure may be achieved in a plurality of forms. These embodiments are provided to understand the present disclosure. The drawings and the embodiments of the present disclosure are only for exemplary purposes.

A plurality of steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term “including” and variations thereof used in this article are open-ended inclusion, namely “including but not limited to”. The term “based on” refers to “at least partially based on”. The term “one embodiment” means “at least one embodiment”; the term “another embodiment” means “at least one other embodiment”; and the term “some embodiments” means “at least some embodiments”. Relevant definitions of other terms may be given in the description hereinafter.

Concepts such as “first” and “second” mentioned in the present disclosure are only used to distinguish different apparatuses, modules or units, and are not intended to limit orders or interdependence relationships of functions performed by these apparatuses, modules or units.

Modifications of “one” and “more” mentioned in the present disclosure are schematic rather than restrictive, and those skilled in the art should understand that unless otherwise stated in the context, it should be understood as “one or more”.

Names of messages or information exchanged between a plurality of apparatuses in embodiments of the present disclosure are only used for the purpose of description and not meant to limit the scope of these messages or information.

FIG. 1 is a flowchart diagram of a publishing method for multimedia content according to an embodiment of the present disclosure. The method may be performed by a publishing apparatus for multimedia content. The apparatus may be implemented by software and/or hardware, and may be configured in an electronic device, for example, a mobile phone or a tablet computer. The publishing method for the multimedia content provided by the embodiments of the present disclosure is applicable to a scenario of multimedia content authoring using a multimedia content template, for example applicable to a scenario of video authoring using a text type video template. As shown in FIG. 1, the publishing method for the multimedia content provided by the embodiment may include:

S101, displaying a target multimedia content template on a display page.

The target multimedia content template may be the currently displayed multimedia content template, i.e., the multimedia content template with which the user intends to author the multimedia content. The multimedia content template may be a template for generating the multimedia content, such as a template for generating video multimedia content based on user-added copywriting, i.e., a text type video template. The text type video template may include a wishing template for recording the user’s wishes or a planning template for recording the user’s goals, or the like. Hereinafter, the target multimedia content template is described as an example of a New Year wishing template.

In the present embodiment, the electronic device may display the target multimedia content template based on a corresponding triggering operation of the user displaying the target multimedia content template.

For example, when there is an activity of using the target multimedia content template for multimedia content authoring, like a New Year wishing activity or the like, the user may perform a triggering operation of attending the activity in the activity page; alternatively, the user may instruct the electronic device to display template information of the target multimedia content template by performing a template viewing operation when viewing multimedia content authored by other users using the target multimedia content template. The user may also perform a use operation for the target multimedia content template when the user intends to author the multimedia content using the target multimedia content template. Accordingly, the electronic device may display the target multimedia content template on the display page when receiving a user’s triggering operation of attending the activity or when receiving a user’s use operation for the target multimedia content template, as shown in FIG. 2.

Figure 2:
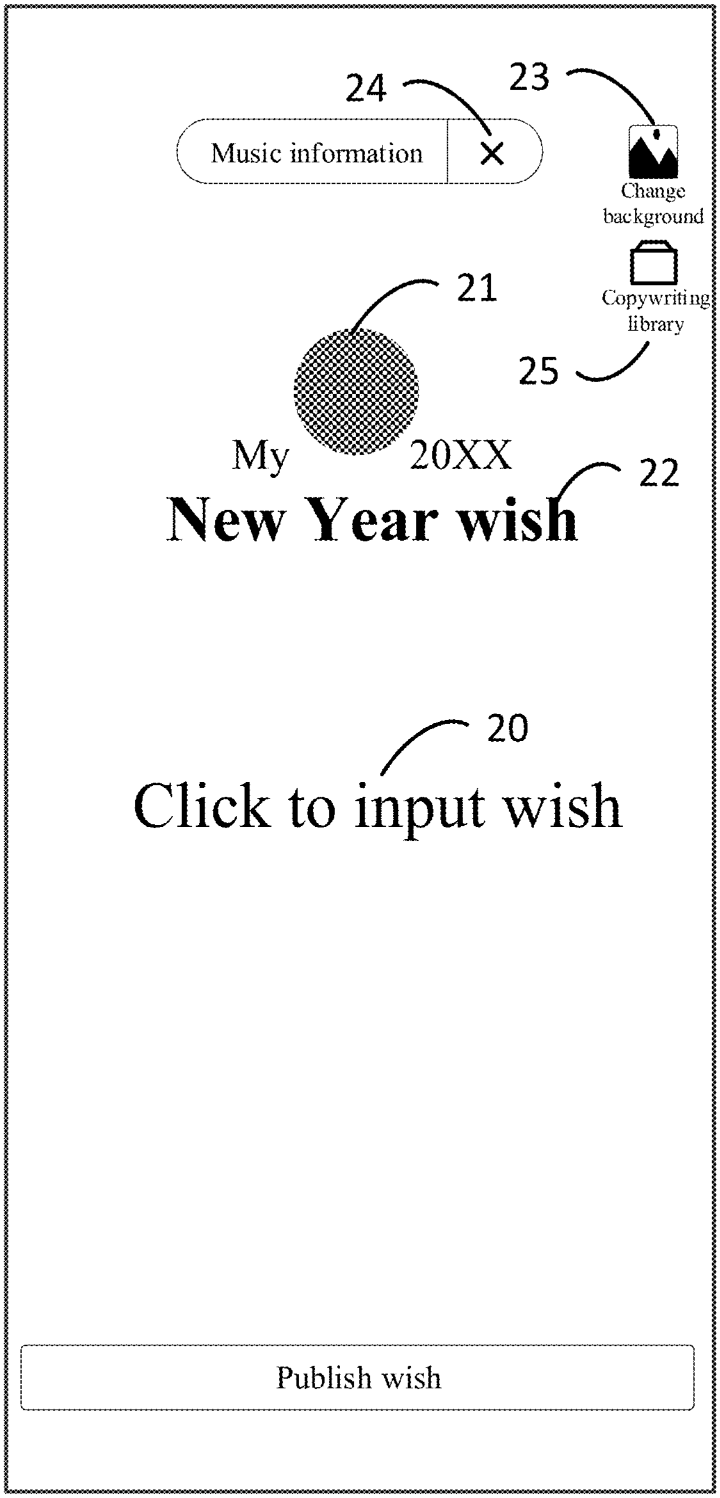
FIG. 2 is a schematic diagram of a target multimedia content template according to an embodiment of the present disclosure.

Continuing to refer to FIG. 2, a copywriting prompt information 20 may be displayed in the target multimedia content template to prompt the user to input copywriting. In addition, identification information 21 of the user and/or multimedia content information 22 of the target multimedia content may be displayed in the target multimedia content template. The identification information 21 may be information such as an avatar and/or a user name of the user, so that the target multimedia content to be generated carries the user’s personalization information to meet the user’s personalization needs. The multimedia content information 22 may be the subject information of the target multimedia content or other non-modifiable text content carried in the target multimedia content template, such as the text “My 20XX New Year wish” shown in FIG. 2.

Figure 3:
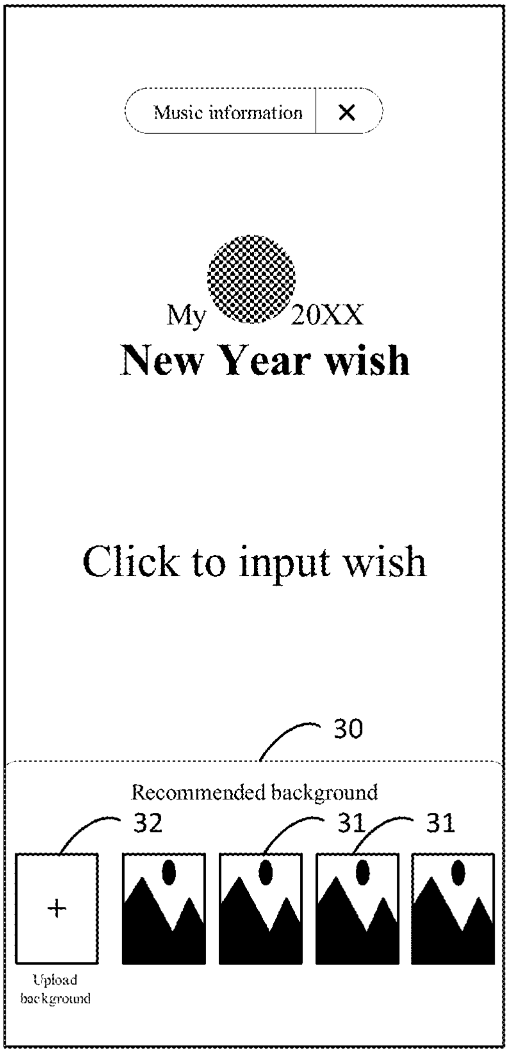
FIG. 3 is a schematic diagram of a recommended background display window according to an embodiment of the present disclosure.

In addition, a background picture (not shown in FIG. 2) may also be displayed in the target multimedia content template, such as a default background picture carried in the target multimedia content template. Thus, as shown in FIG. 2, the user can trigger the background change control 23 displayed in the display page of the target multimedia content template when he or she intends to change the background picture. The electronic device, upon detecting that the user triggers the background change control 23, may display a recommended background display window 30 and display a recommended background picture 31 and an upload background control 32 in the recommended background display window 30, as illustrated in FIG. 3. When the user intends to select a recommended background picture 31, the recommended background picture 31 may be triggered. Accordingly, the electronic device, upon detecting that a user triggers a certain recommended background picture 31, may replace the background picture displayed in the target multimedia content template with the recommended background picture 31, and close or keep displaying the recommended background display window 30. The user may trigger the upload background control 32 when he or she intends to upload a background picture. The electronic device, upon detecting that the user triggers the upload background control 32, may display a picture page and display an online picture and/or a local picture of the user in the picture page. When the user intends to select a picture, the user may trigger the picture. Accordingly, the electronic device, upon detecting that a user triggers a picture, may return to the display page of the target multimedia content template and replace the background picture displayed in the target multimedia content template with the picture.

S102, in response to a copywriting display operation, displaying at least two preset copywritings corresponding to the target multimedia content template.

The copywriting display operation may be an operation of instructing the electronic device to display preset copywritings corresponding to the target multimedia content template, such as a list display operation or a virtual keyboard display operation, or the like. The preset copywriting corresponding to the target multimedia content template may be a preset copywriting that can be added to the target multimedia content template for generating the multimedia content, and may be a copywriting corresponding to the authoring subject of the target multimedia content template. For example, the preset copywriting may be a preset wishing content when the target multimedia content template is a wishing template, and the preset copywriting may be a preset planning content (e.g., a target) when the target multimedia content template is a planning template.

Figure 4:
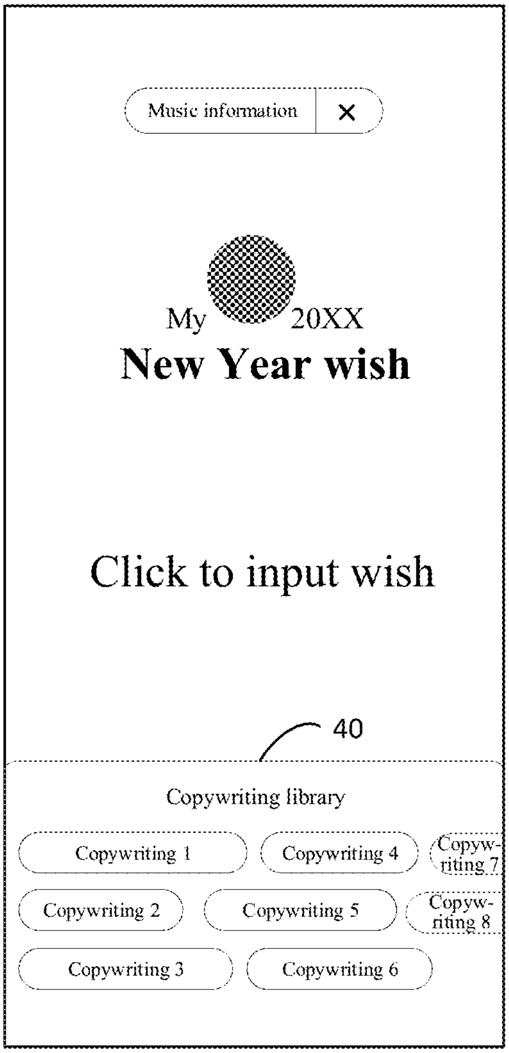
FIG. 4 is a schematic diagram of a copywriting list according to an embodiment of the present disclosure.
Figure 5:
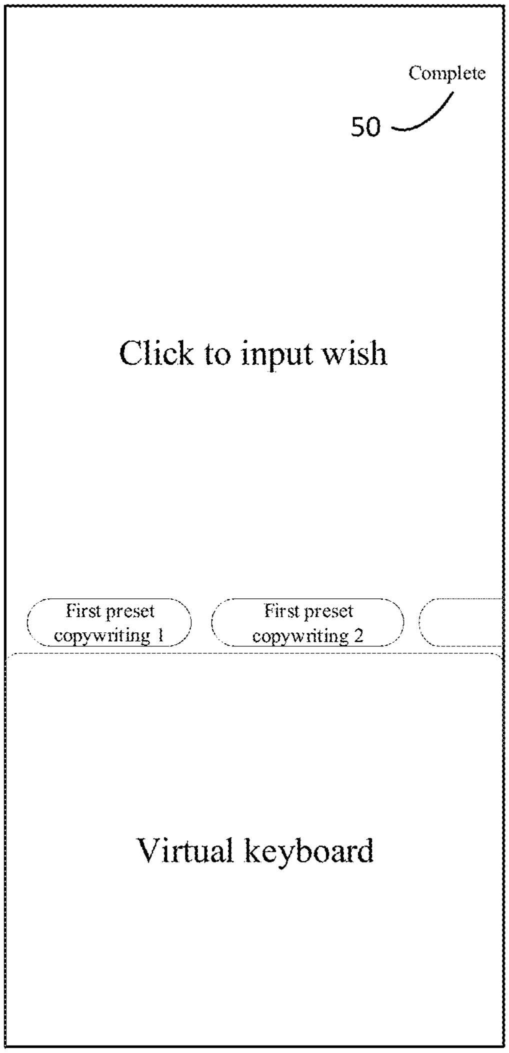
FIG. 5 is a display schematic diagram of a first preset copywriting according to an embodiment of the present disclosure.

The user may perform a copywriting display operation when he or she intends to view a copywriting. Accordingly, the electronic device, upon receiving the copywriting display operation of the user, may display the preset copywritings corresponding to the target multimedia content template, such as displaying the copywriting list of the target multimedia content template (as shown in FIG. 4), or displaying the recommended copywriting corresponding to the target multimedia content template, that is, displaying the recommended copywriting among the preset copywritings corresponding to the target multimedia content (as shown in FIG. 5), or the like.

In this embodiment, a copywriting may be preset so that the user can directly add the preset copywriting to the multimedia content template for multimedia content authoring, or can input a copywriting with reference to the preset copywriting, thereby reducing the difficulty of multimedia content authoring using the multimedia content template, and avoiding the situation where the user does not know what kind of copywriting to input. Also, because the user does not need to think about what kind of copywriting to input for a long time, and when there is a preset copywriting that the user intends to add, the user can directly select the preset copywriting to add without inputting a text, so the present embodiment can also reduce the time taken for the user to think about the content of the copywriting, and the time taken for the user to input the text, thereby improving the user's authoring efficiency.

S103, in response to a triggering operation on a target copywriting in the preset copywriting, adding the target copywriting to the target multimedia content template.

The target copywriting may be a preset copywriting (including a recommended copywriting) triggered by the user.

Figure 6:
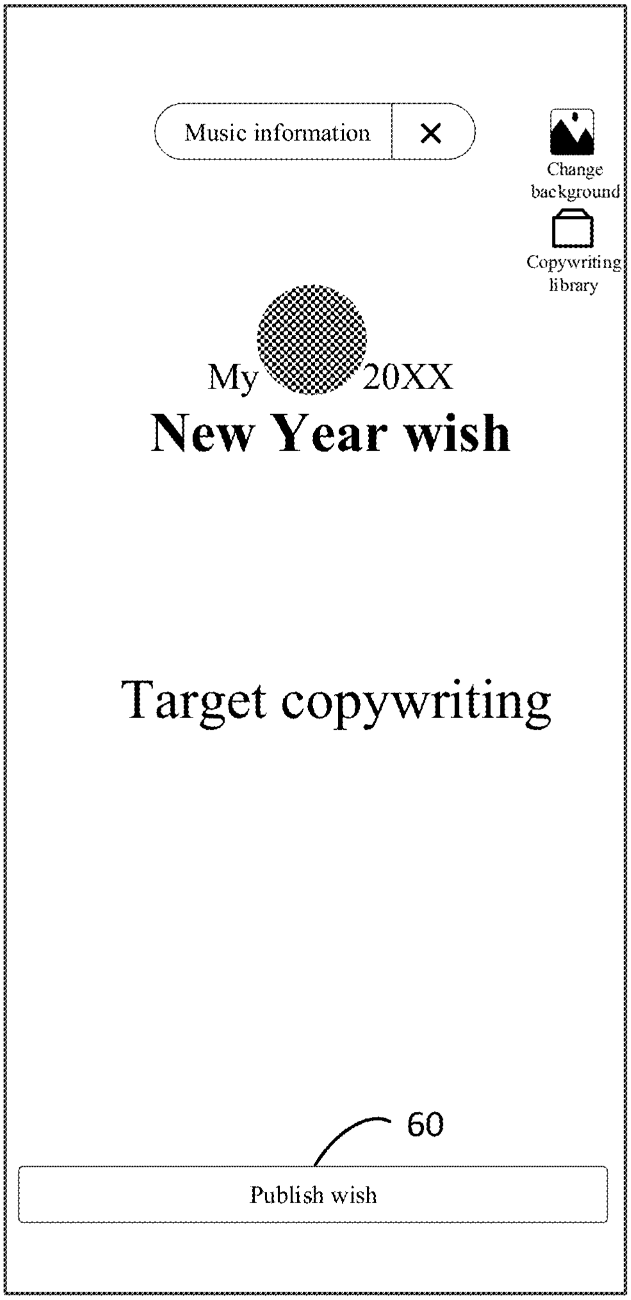
FIG. 6 is a schematic diagram of another target multimedia content template according to an embodiment of the present disclosure.

Specifically, as shown in FIGS. 4 and 5, the electronic device displays preset copywritings corresponding to the target multimedia content template or displays the recommended copywriting among the preset copywritings corresponding to the target multimedia content. Thus, a user may trigger a preset copywriting (including a recommended copywriting) when the user intends to select the preset copywriting. Accordingly, the electronic device, upon detecting that a user triggers a preset copywriting, may take the preset copywriting as a target copywriting, add the target copywriting to the target multimedia content template, as shown in FIG. 6, and may stop displaying the preset copywriting/recommended copywriting corresponding to the target multimedia content, or continue displaying the preset copywriting/recommended copywriting corresponding to the target multimedia content.

In this embodiment, the manner in which the target copywriting is added to the target multimedia content template may be set as desired, e.g., when no copywriting has been added to the target multimedia content template, the target copywriting may be directly added to the target multimedia content template. When a copywriting (i.e., the original copywriting) has been added to the target multimedia content template, the target copywriting may be used to replace the copywriting that has been added to the target multimedia content template, in which case, after the target copywriting is added, only one copywriting is displayed in the target multimedia content template, i.e., only the target copywriting is displayed. The target copywriting may also be added to the target multimedia content template, in which case the target copywriting is added and the original copywriting and the target copywriting are displayed in the target multimedia content template. At this time, the adding the target copywriting to the target multimedia content template includes: replacing an original copywriting added to the target multimedia content template using the target copywriting; or adding and displaying the target copywriting in the target multimedia content template and maintaining displaying the original copywriting added in the target multimedia content template. The original copywriting includes a sample copywriting carried in the target multimedia content template and/or a history copywriting added to the target multimedia content template by a user prior to a current moment. Here, when the target multimedia content template is initially displayed, the target multimedia content template may or may not carry a sample copywriting therein, and when carried, the user may delete the sample copywriting through a corresponding delete operation.

S104, in response to a publishing operation, generating target multimedia content using the target copywriting and publishing the target multimedia content.

The publishing operation may be an operation to publish the target multimedia content, such as an operation to trigger a publish control. The target multimedia content may be a multimedia content generated using the target multimedia content template, such as a video generated using the target multimedia content template.

Exemplarily, as shown in FIG. 6, when the copywriting is added, the user may trigger the publishing control 60 displayed by the electronic device to generate and publish the target multimedia content. Accordingly, the electronic device, upon detecting that the user triggers the publishing control 60, may use the target multimedia content template to generate the target multimedia content according to the copywriting added by the user, and upload the target multimedia content to the server for publishing.

In the present embodiment, the publishing operation may be performed on the display page of the target multimedia content template, e.g., the publishing control may be displayed in the display page of the target multimedia content template, so that the user can perform the addition of the content of the target multimedia content and the generation and publishing of the target multimedia content in the same page without switching the page, which can simplify the operation required for the user to author and publish the multimedia content. At this time, the in response to a publishing operation, generating target multimedia content using the target copywriting and publishing the target multimedia content includes: in response to the publishing operation triggered on the display page, generating target multimedia content using the target copywriting and publishing the target multimedia content.

In an implementation, the publishing method for the multimedia content provided in the present embodiment may further include: acquiring target music matching the target multimedia content template, adding the target music to the target multimedia content template as background music of the target multimedia content, and displaying musical information of the target music.

The target music may be music that matches the target multimedia content template, such as music that matches the subject of the target multimedia content template, the activity (e.g., festival, etc.) that corresponds to the target multimedia content template, and/or the copywriting added in the target multimedia content template.

When the target multimedia content template is displayed, the target music matching the target multimedia content template may be determined or acquired from the server, the target music may be added to the target multimedia content template as background music of the target multimedia content generated subsequently, and music information of the target music may be displayed in the target multimedia content template, as shown in FIG. 2, such as music name of the target music. The target music may also be played, so that the user determines whether to use the target music as background music of the target multimedia content by listening to the target music.

Thus, the user may trigger the delete control 24 displayed in the display page when the user does not intend to use the target music as background music of the target multimedia content. Accordingly, the electronic device, upon detecting that the user triggers the delete control 24, may delete the target music from the target multimedia content template and stop displaying the music information of the target music. The music information of the target music may be triggered when the user intends to replace the target music with other music. Accordingly, the electronic device may display a music list upon detecting that the user triggers the music information of the target music, and upon detecting that the user triggers the music identification information of a piece of music displayed in the music list, add the music to the target multimedia content template as the background music of the target multimedia content, and display the music information of the music.

In addition, when the target music is determined based on the copywriting added in the target multimedia content template, if the copywriting added in the target multimedia content template changes, the target music added in the target multimedia content template may or may not be updated, and may be set as desired.

According to the present embodiment, the publishing method for the multimedia content includes displaying a target multimedia content template on a display page; in response to a copywriting display operation, displaying at least two preset copywritings corresponding to the target multimedia content template; in response to a triggering operation on a target copywriting in the preset copywriting, adding the target copywriting to the target multimedia content template; and in response to a publishing operation, generating target multimedia content using the target copywriting and publishing the target multimedia content. The present embodiment, using the above technical solution, can save the time taken for the user to add the copywriting to the multimedia content template, reduce the difficulty of multimedia content authoring, and improve the user experience, by providing the user with the copywriting that may be added to the multimedia content template.

Figure 7:
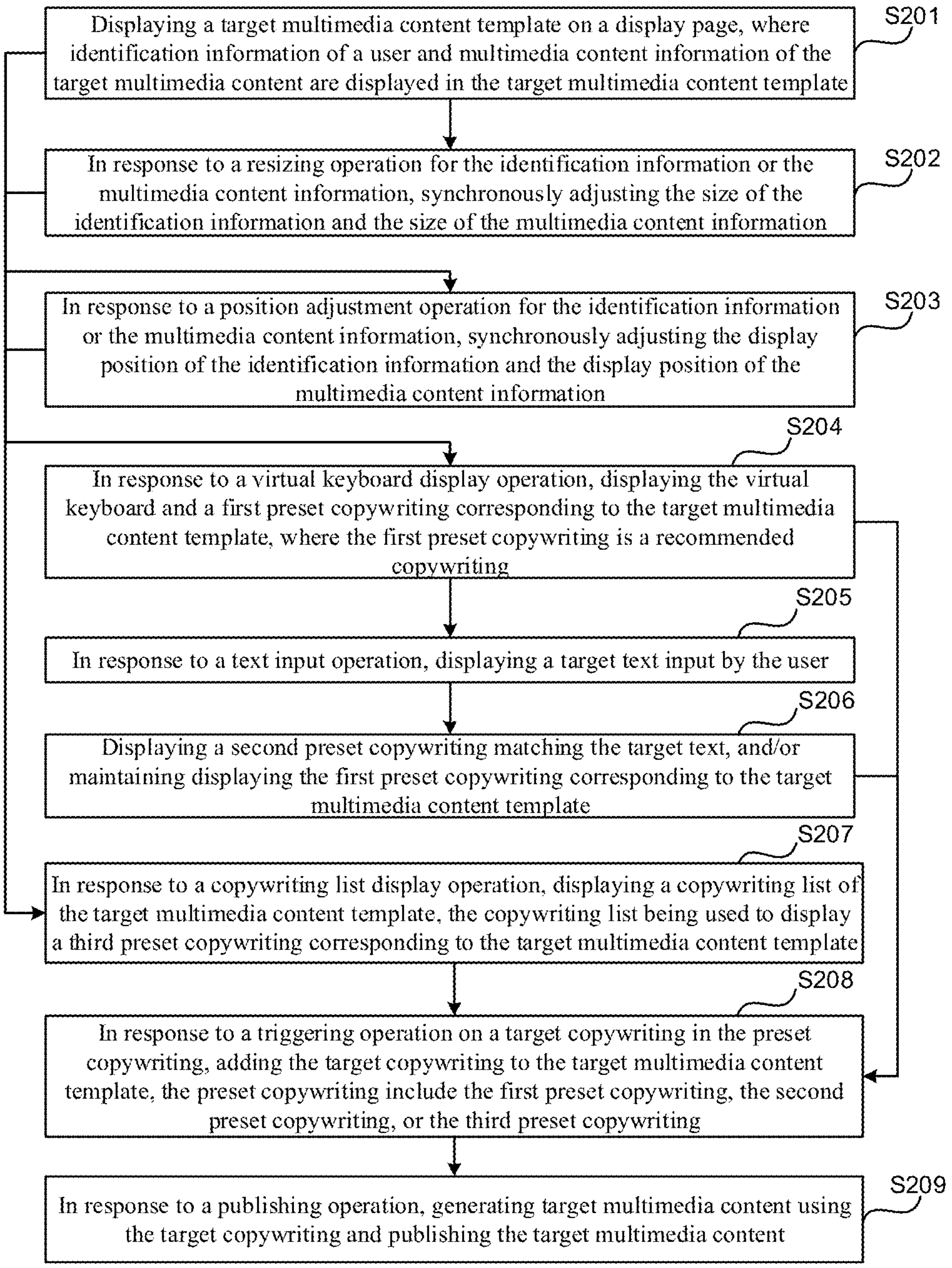
FIG. 7 is a flowchart diagram of another publishing method for multimedia content according to an embodiment of the present disclosure.

FIG. 7 is a flowchart diagram of another publishing method for multimedia content according to an embodiment of the present disclosure. The schemes in the present embodiment may be combined with one or more schemes in the above embodiments. The copywriting display operation includes a virtual keyboard display operation, and the displaying at least two preset copywritings corresponding to the target multimedia content template includes: displaying the virtual keyboard and a first preset copywriting corresponding to the target multimedia content template, the first preset copywriting being a recommended copywriting.

After the displaying the virtual keyboard and a first preset copywriting corresponding to the target multimedia content template, the method further includes: in response to a text input operation, displaying a target text input by a user; displaying a second preset copywriting matching the target text, and/or maintaining displaying the first preset copywriting corresponding to the target multimedia content template.

The copywriting display operation includes a copywriting list display operation, and the displaying at least two preset copywritings corresponding to the target multimedia content template includes: displaying a copywriting list of the target multimedia content template, the copywriting list being used to display a third preset copywriting corresponding to the target multimedia content template.

Multimedia content information of the target multimedia content is further displayed in the target multimedia content template, and the method further includes: in response to a resizing operation for the identification information or the multimedia content information, synchronously adjusting a size of the identification information and a size of the multimedia content information; and/or, in response to a position adjustment operation for the identification information or the multimedia content information, synchronously adjusting a display position of the identification information and a display position of the multimedia content information.

Accordingly, as shown in FIG. 7, the publishing method for the multimedia content provided by the present embodiment may include:

S201, displaying a target multimedia content template on a display page, and performing S202, S203, S204 or S207, where identification information of a user and multimedia content information of the target multimedia content are displayed in the target multimedia content template.

S202, in response to a resizing operation for the identification information or the multimedia content information, synchronously adjusting the size of the identification information and the size of the multimedia content information, and performing S203, S204 or S207.

The resizing operation may be an operation of resizing the identification information of the user or the multimedia content information of the target multimedia content, such as a multi-finger zoom operation acting on the identification information displayed in the target multimedia content template or a multi-finger zoom operation acting on the multimedia content information displayed in the target multimedia content template.

As shown in FIG. 2, the electronic device displays identification information 21 of the user and multimedia content information 22 of the target multimedia content in the target multimedia content template. Thus, when the user intends to resize the identification information 21, the user can perform a resizing operation for the identification information 21. When the user intends to resize the multimedia content information 22, the user may perform a resizing operation for the multimedia content information 22. Accordingly, the electronic device, upon receiving a resizing operation for the identification information 21 and/or the multimedia content information 22 displayed in the target multimedia content template, may synchronously resize the identification information 21 and the multimedia content information 22.

S203, in response to a position adjustment operation for the identification information or the multimedia content information, synchronously adjusting the display position of the identification information and the display position of the multimedia content information, and performing S204 or S207.

The position adjusting operation may be an operation of adjusting the display position of the identification information of the user or the multimedia content information of the target multimedia content, such as a dragging operation acting on the identification information displayed in the target multimedia content template or a dragging operation acting on the multimedia content information displayed in the target multimedia content template, or the like.

As shown in FIG. 2, the electronic device displays identification information 21 of the user and multimedia content information 22 of the target multimedia content in the target multimedia content template. Thus, when the user intends to adjust the display position of the identification information 21, the user may perform a position adjustment operation for the identification information 21. When the user intends to adjust the display position of the multimedia content information 22, the user may perform a position adjustment operation for the multimedia content information 22. Accordingly, the electronic device, upon receiving a position adjustment operation for the identification information 21 and/or the multimedia content information 22 displayed in the target multimedia content template, may synchronously adjust the display positions of the identification information 21 and the multimedia content information 22.

In this embodiment, the sizes and/or display positions of the multimedia content information and the identification information of the user displayed in the target multimedia content template can be synchronously adjusted, so that the relative sizes and/or relative positions of the multimedia content information and the identification information displayed in the target multimedia content template remain unchanged during the adjustment process, further improving the visual aesthetics of the generated target multimedia content.

S204, in response to a virtual keyboard display operation, displaying the virtual keyboard and a first preset copywriting corresponding to the target multimedia content template, and performing S205 or S208, where the first preset copywriting is a recommended copywriting.

The virtual keyboard display operation may be an operation instructing the electronic device to display a virtual keyboard, such as a click operation acting on a blank area (such as a copywriting input area) of the target multimedia content template, or the like. The first preset copywriting may be a recommended copywriting of the target multimedia content template, which may be determined according to the matching degree of each preset copywriting with the target multimedia content template, and/or the number of uses of each preset copywriting, and the like.

In the present embodiment, when the user intends to input copywriting, the recommended copywriting of the target multimedia content template may be displayed, so that the user directly selects a copywriting from the displayed recommended copywriting to add to the target multimedia content template without the user inputting a copywriting, thereby improving the multimedia content authoring efficiency of the user.

As shown in FIG. 2, the electronic device displays a target multimedia content template. Thus, the user may click on the blank area of the target multimedia content template when he or she intends to input a copywriting. Accordingly, the electronic device, upon detecting a user's click operation, may determine that a virtual keyboard display operation is received, and in response to the virtual keyboard display operation, the virtual keyboard and the recommended copywriting of the target multimedia content template are displayed. For example, a copywriting input area and the virtual keyboard may be displayed in the display page of the target multimedia content template, and the recommended copywriting of the target multimedia content template may be displayed above the virtual keyboard, as shown in FIG. 5.

In addition, after displaying the recommended copywriting of the target multimedia content template, the user may switch the recommended copywriting displayed in the display page of the target multimedia content template through a recommended copywriting switching operation (e.g., a swipe-down operation, etc.) to view different recommended copywritings of the target multimedia content template.

S205, in response to a text input operation, displaying a target text input by the user.

In this embodiment, the target text input by the user may be displayed when the operation of inputting the text by the user is detected. For example, the target text input by the user is displayed in the copywriting display area of the target multimedia content template, or the target text input by the user is displayed in the copywriting input page, or the like. The target text may be a text input by the user.

Further, as shown in FIG. 5, when the copywriting input area is displayed, a completion control 50 may be further displayed, so that the user, upon completion of the input, may instruct the electronic device to stop displaying the copywriting input area by triggering the completion control 50 and display the copywriting input by the user in the copywriting input area in the target multimedia content template.

S206, displaying a second preset copywriting matching the target text, and/or maintaining displaying the first preset copywriting corresponding to the target multimedia content template, performing S208.

The second preset copywriting may be a preset copywriting matching the text input by the user, such as a preset copywriting containing the text input by the user or a copywriting having the same meaning as the text input by the user.

Figure 8:
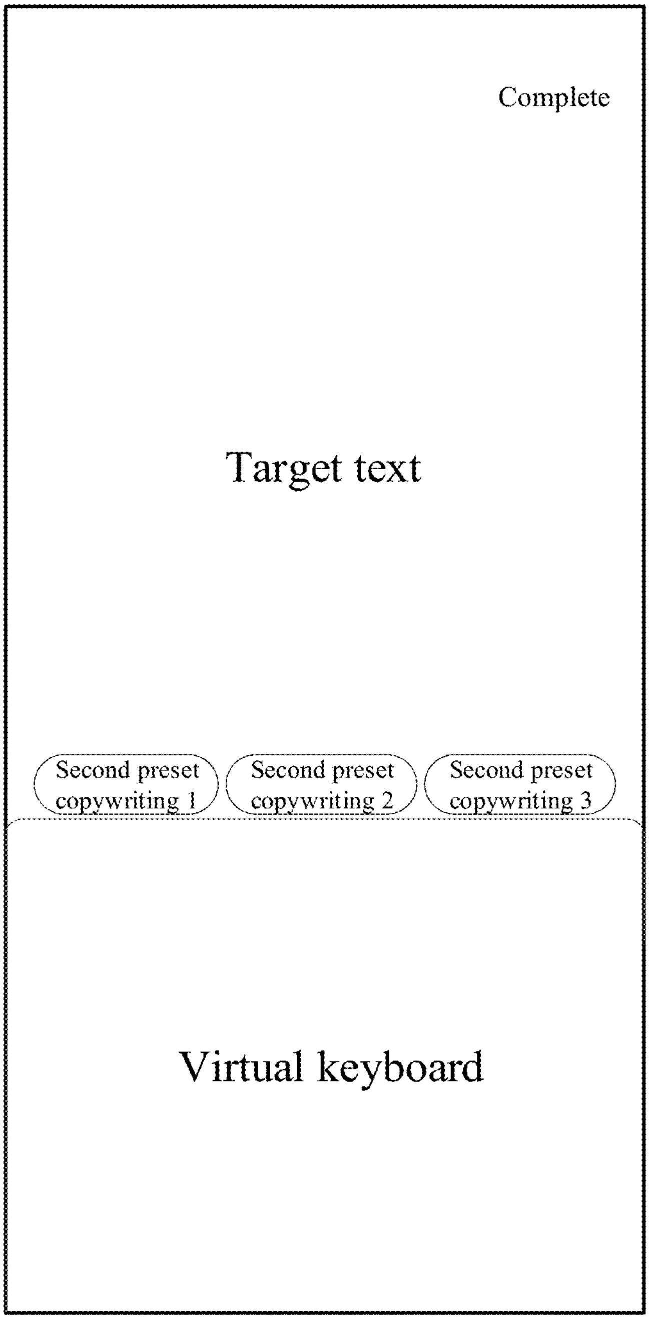
FIG. 8 is a display schematic diagram of a second preset copywriting according to an embodiment of the present disclosure.
Figure 9:
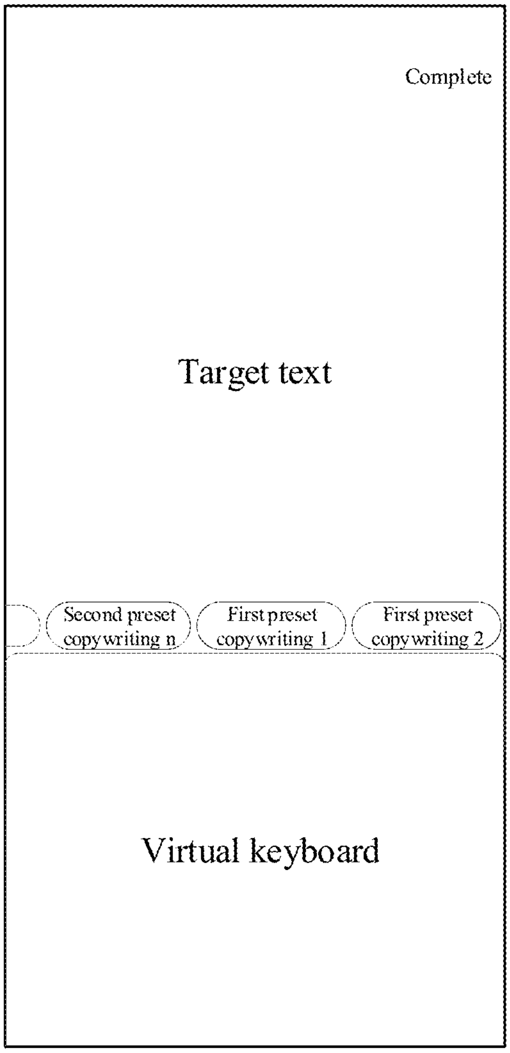
FIG. 9 is a display schematic diagram of a first preset copywriting and a second preset copywriting according to an embodiment of the present disclosure.

In the present embodiment, after the user inputs the target text, the copywriting matching may not be performed, and the first preset copywriting corresponding to the target multimedia content template is maintained to be displayed. The copywriting matching may also be performed, acquiring a second preset copywriting matching the target text input by the user, and replacing the displayed first preset copywriting with the second preset copywriting, as shown in FIG. 8. Alternatively, the first preset copywriting is displayed simultaneously with the second preset copywriting, e.g., the second preset copywritings are displayed preferentially, and the first preset copywritings are displayed behind the second preset copywriting, as shown in FIG. 9, and the like.

S207, in response to a copywriting list display operation, displaying a copywriting list of the target multimedia content template, the copywriting list being used to display a third preset copywriting corresponding to the target multimedia content template.

The copywriting list display operation may be an operation of instructing the electronic device to display a copywriting list of the target multimedia content template, such as a triggering operation of triggering a copywriting control displayed in a display page of the target multimedia content template. The third preset copywriting may be a preset copywriting displayed in the copywriting list. The copywriting list may be a list for displaying preset copywritings corresponding to the target multimedia content template.

Specifically, as shown in FIG. 2, the electronic device may display a target multimedia content template and a copywriting control 25. Thus, the user may trigger the copywriting control 25 when he or she intends to view the preset copywritings. Correspondingly, the electronic device, upon detecting that the user triggers the copywriting control 25, may determine that a copywriting list display operation is received, and in response to the copywriting list display operation, display a copywriting list 40 of the target multimedia content template in the display page of the target multimedia content template, and display the preset copywritings of the target multimedia content template in the copywriting list 40, as shown in FIG. 4; or switching the current page from the display page of the target multimedia content template to a copywriting display page, displaying the copywriting list 40 of the target multimedia content template in the copywriting display page, and displaying the preset copywritings of the target multimedia content template in the copywriting list 40.

S208, in response to a triggering operation on a target copywriting in the preset copywriting, adding the target copywriting to the target multimedia content template, the preset copywriting include the first preset copywriting, the second preset copywriting, or the third preset copywriting.

S209, in response to a publishing operation, generating target multimedia content using the target copywriting and publishing the target multimedia content.

The publishing method for the multimedia content provided by the embodiment, by displaying the recommended copywriting of the target multimedia content template, the copywriting matching the text input by the user, and/or the preset copywriting of the target multimedia content template, and by adjusting the size and/or position of the identification information of the user and the multimedia content information of the target multimedia content, is capable of simplifying the operations required by the user in the multimedia content authoring process, reducing the multimedia content authoring difficulty, improving the aesthetics of the generated multimedia content, and improving the user experience.

Figure 10:
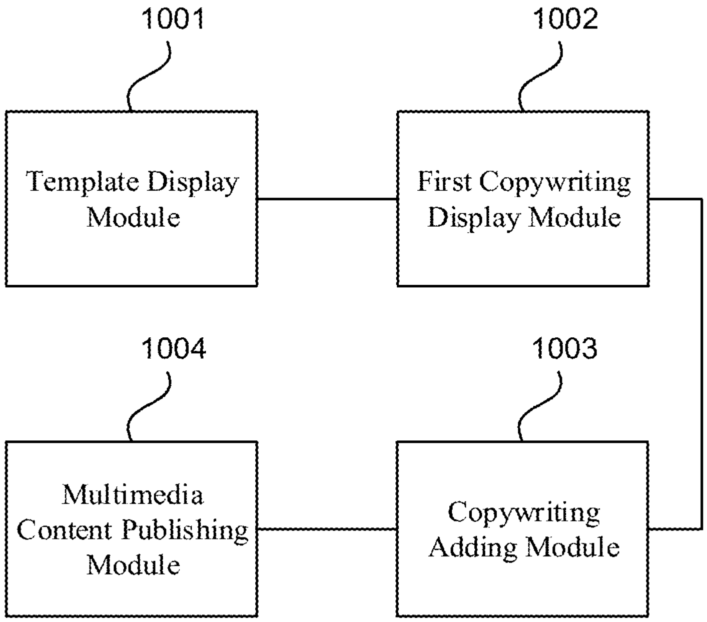
FIG. 10 is a block diagram of a publishing apparatus for multimedia content according to an embodiment of the present disclosure.

FIG. 10 is a block diagram of a publishing apparatus for multimedia content according to an embodiment of the present disclosure. The apparatus may be implemented by software and/or hardware, and may be configured in an electronic device, for example, a mobile phone or a tablet computer, and may generate target multimedia content by executing a publishing method for multimedia content. As shown in FIG. 10, the publishing apparatus for the multimedia content provided by the present embodiment may include: a template display module 1001, a first copywriting display module 1002, a copywriting adding module 1003, and multimedia content publishing module 1004. The template display module 1001 is configured to display a target multimedia content template on a display page. The first copywriting display module 1002 is configured to, in response to a copywriting display operation, display at least two preset copywritings corresponding to the target multimedia content template. The copywriting adding module 1003 is configured to, in response to a triggering operation on a target copywriting in the preset copywriting, add the target copywriting to the target multimedia content template. The multimedia content publishing module 1004 is configured to, in response to a publishing operation, generate target multimedia content using the target copywriting and publish the target multimedia content.

According to the publishing apparatus for the multimedia content provided by the embodiment, a target multimedia content template is displayed on a display page through the template display module; in response to a copywriting display operation, at least two preset copywritings corresponding to the target multimedia content template are displayed through the first copywriting display module; in response to a triggering operation on a target copywriting in the preset copywriting, the target copywriting is added to the target multimedia content template through the copywriting adding module; in response to a publishing operation, target multimedia content is generated using the target copywriting and the target multimedia content is published through the multimedia content publishing module. Using the above technical solution, the present embodiment provides the user with copywriting that can be added to the multimedia content template, which can save the time spent by the user in adding copywriting, and reduce the difficulty of authoring the multimedia content and improve the user experience.

In the above scheme, the copywriting display operation may include a virtual keyboard display operation, and the first copywriting display module 1002 may be configured to display the virtual keyboard and a first preset copywriting corresponding to the target multimedia content template, where the first preset copywriting is a recommended copywriting.

In an embodiment, the publishing apparatus for the multimedia content may further include: a text display module, configured to, after the displaying the virtual keyboard and a first preset copywriting corresponding to the target multimedia content template, display a target text input by a user in response to a text input operation; and a second copywriting display module, configured to display a second preset copywriting matching the target text, and/or maintain displaying the first preset copywriting corresponding to the target multimedia content template.

In the above scheme, the copywriting display operation includes copywriting list display operation, and the first copywriting display module 1002 may be configured to: display a copywriting list of the target multimedia content template, where the copywriting list is used to display a third preset copywriting corresponding to the target multimedia content template.

In the above scheme, the copywriting adding module 1003 may be configured to: replace an original copywriting added to the target multimedia content template using the target copywriting; or add and display the target copywriting in the target multimedia content template and maintain displaying the original copywriting added in the target multimedia content template. The original copywriting comprises at least one of: a sample copywriting carried in the target multimedia content template; and a history copywriting added to the target multimedia content template by a user prior to a current moment.

In the above scheme, identification information of a user is displayed in the target multimedia content template.

In the above scheme, multimedia content information of the target multimedia content may be further displayed in the target multimedia content template, and the publishing apparatus for the multimedia content provided by the embodiment may further include: a size adjustment module, configured to, in response to a resizing operation for the identification information or the multimedia content information, synchronously adjust a size of the identification information and a size of the multimedia content information; and/or a position adjustment module, configured to, in response to a position adjustment operation for the identification information or the multimedia content information, synchronously adjust a display position of the identification information and a display position of the multimedia content information.

In an embodiment, the publishing apparatus for the multimedia content may further include: a music adding module configured to acquire target music matching the target multimedia content template, add the target music to the target multimedia content template as background music of the target multimedia content, and display musical information of the target music.

In the above scheme, the multimedia content publishing module 1004 may be configured to, in response to the publishing operation triggered on the display page, generate target multimedia content using the target copywriting and publish the target multimedia content.

The publishing apparatus for the multimedia content provided by the embodiments of the present disclosure may perform the publishing method for the multimedia content provided by any of the embodiments of the present disclosure, and has corresponding functional modules and beneficial effects to perform the publishing method for the multimedia content. Technical details, which are not described in detail in this embodiment, may be referred to the publishing method for the multimedia content provided by any embodiment of the present disclosure.

Figure 11:
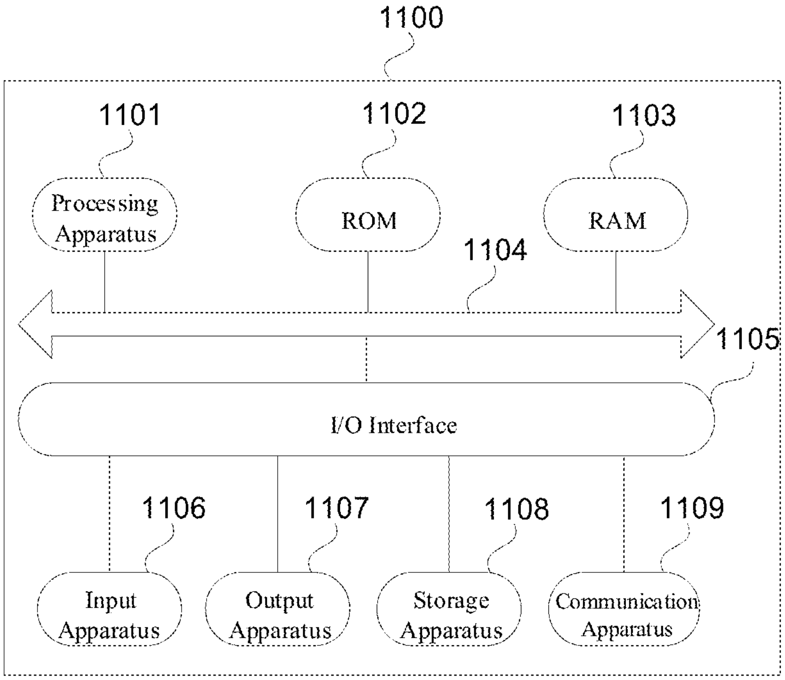
FIG. 11 is a structural schematic diagram of an electronic device according to an embodiment of the present disclosure.

FIG. 11 is specifically referred below, and it shows the structure schematic diagram suitable for achieving the electronic device (e.g. terminal device) 1100 in the embodiment of the present disclosure. The terminal device in the embodiment of the present disclosure may include but not be limited to a mobile terminal such as a mobile phone, a notebook computer, a digital broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device 1100 shown in FIG. 11 is only an example and should not impose any limitations on the functions and use scopes of the embodiments of the present disclosure.

As shown in FIG. 11, the electronic device 1100 may include a processing apparatus (such as a central processing unit, and a graphics processor) 1101, it may execute a plurality of appropriate actions and processes according to a program stored in a read-only memory (ROM) 1102 or a program loaded from a storage apparatus 1108 to a random access memory (RAM) 1103. In RAM 1103, a plurality of programs and data required for operations of the electronic device 1100 are also stored. The processing apparatus 1101, ROM 1102, and RAM 1103 are connected to each other by a bus 1104. An input/output (I/O) interface 1105 is also connected to the bus 1104.

Typically, the following apparatuses may be connected to the I/O interface 1105: an input apparatus 1106 such as a touch screen, a touchpad, a keyboard, a mouse, a camera, a microphone, an accelerometer, and a gyroscope; an output apparatus 1107 such as a liquid crystal display (LCD), a loudspeaker, and a vibrator; a storage apparatus 1108 such as a magnetic tape, and a hard disk drive; and a communication apparatus 1109. The communication apparatus 1109 may allow the electronic device 1100 to wireless-communicate or wire-communicate with other devices so as to exchange data. Although FIG. 11 shows the electronic device 1100 with a plurality of apparatuses, it is not required to implement or possess all the apparatuses shown. Alternatively, it may implement or possess the more or less apparatuses.

According to the embodiment of the present disclosure, the process described above with reference to the flowchart may be achieved as a computer software program. For example, an embodiment of the present disclosure includes a computer program product, it includes a computer program carried on a non-transitory computer-readable medium, and the computer program includes program codes for executing the method shown in the flowchart. In such an embodiment, the computer program may be downloaded and installed from the network by the communication apparatus 1109, or installed from the storage apparatus 1108, or installed from ROM 1102. When the computer program is executed by the processing apparatus 1101, the above functions defined in the method in the embodiments of the present disclosure are executed.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More examples of the computer-readable storage medium may include but not be limited to: an electric connector with one or more wires, a portable computer magnetic disk, a hard disk drive, a RAM, a ROM, an erasable programmable read-only memory (EPROM or flash memory), an optical fiber, a compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt a plurality of forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the electronic device described above, or may exist alone without being assembled into the electronic device.

The above-mentioned computer-readable medium carries one or more programs which, when executed by the electronic device, cause the electronic device to: display a target multimedia content template on a display page; in response to a copywriting display operation, display at least two preset copywritings corresponding to the target multimedia content template; in response to a triggering operation on a target copywriting in the preset copywriting, add the target copywriting to the target multimedia content template; and in response to a publishing operation, generate target multimedia content using the target copywriting and publish the target multimedia content.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flowcharts and the block diagrams in the drawings show possibly achieved system architectures, functions, and operations of systems, methods, and computer program products according to a plurality of embodiments of the present disclosure. At this point, each box in the flowchart or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. The name of the unit does not constitute a limitation for the unit itself in a case.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard part (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides a publishing method for multimedia content, including:

- displaying a target multimedia content template on a display page;
- in response to a copywriting display operation, displaying at least two preset copywritings corresponding to the target multimedia content template;
- in response to a triggering operation on a target copywriting in the preset copywriting, adding the target copywriting to the target multimedia content template; and
- in response to a publishing operation, generating target multimedia content using the target copywriting and publishing the target multimedia content.

According to one or more embodiments of the present disclosure, Example 2 provides the method according to Example 1, where the copywriting display operation includes a virtual keyboard display operation, the displaying at least two preset copywritings corresponding to the target multimedia content template includes:

- displaying the virtual keyboard and a first preset copywriting corresponding to the target multimedia content template, where the first preset copywriting is a recommended copywriting.

According to one or more embodiments of the present disclosure, Example 3 provides the method according to Example 2, and after the displaying the virtual keyboard and a first preset copywriting corresponding to the target multimedia content template, the method further includes:

- in response to a text input operation, displaying a target text input by a user; and
- performing at least one of: displaying a second preset copywriting matching the target text; and maintaining displaying the first preset copywriting corresponding to the target multimedia content template.

According to one or more embodiments of the present disclosure, Example 4 provides the method according to Example 1, where the copywriting display operation includes a copywriting list display operation, the displaying at least two preset copywritings corresponding to the target multimedia content template includes:

- displaying a copywriting list of the target multimedia content template, where the copywriting list is used to display a third preset copywriting corresponding to the target multimedia content template.

According to one or more embodiments of the present disclosure, Example 5 provides the method according to any one of Examples 1-4, where the adding the target copywriting to the target multimedia content template includes:

- replacing an original copywriting added to the target multimedia content template using the target copywriting; or
- adding and displaying the target copywriting in the target multimedia content template and maintaining displaying the original copywriting added in the target multimedia content template,
- where the original copywriting includes at least one of: a sample copywriting carried in the target multimedia content template; and a history copywriting added to the target multimedia content template by a user prior to a current moment.

According to one or more embodiments of the present disclosure, Example 6 provides the method according to Examples 1-4, where identification information of a user is displayed in the target multimedia content template.

According to one or more embodiments of the present disclosure, Example 7 provides the method according to Example 6, where multimedia content information of the target multimedia content is further displayed in the target multimedia content template, and the method further includes at least one of:

in response to a resizing operation for the identification information or the multimedia content information, synchronously adjusting a size of the identification information and a size of the multimedia content information; and in response to a position adjustment operation for the identification information or the multimedia content information, synchronously adjusting a display position of the identification information and a display position of the multimedia content information.

According to one or more embodiments of the present disclosure, Example 8 provides the method according to Examples 1-4, further including:

acquiring target music matching the target multimedia content template, adding the target music to the target multimedia content template as background music of the target multimedia content, and displaying musical information of the target music.

According to one or more embodiments of the present disclosure, Example 9 provides the method according to Examples 1-4, where the in response to a publishing operation, generating target multimedia content using the target copywriting and publishing the target multimedia content includes:

in response to the publishing operation triggered on the display page, generating target multimedia content using the target copywriting and publishing the target multimedia content.

According to one or more embodiments of the present disclosure, Example 1 provides a publishing apparatus for multimedia content, including:

a template display module, configured to display a target multimedia content template on a display page;

a first copywriting display module, configured to, in response to a copywriting display operation, display at least two preset copywritings corresponding to the target multimedia content template;

a copywriting adding module, configured to, in response to a triggering operation on a target copywriting in the preset copywriting, add the target copywriting to the target multimedia content template; and a multimedia content publishing module, configured to, in response to a publishing operation, generate target multimedia content using the target copywriting and publish the target multimedia content.

According to one or more embodiments of the present disclosure, Example 11 provides an electronic device, including:

at least one processor; and a memory, configured to store at least one program, where the at least one program, upon being executed by the at least one processor, causes the at least one processor to implement the publishing method for the multimedia content according to any one of Examples 1-9.

According to one or more embodiments of the present disclosure, Example 12 provides a computer-readable storage medium, storing computer programs, where the programs, upon being executed by a processor, implement the publishing method for the multimedia content according to any one of Examples 1-9.

According to one or more embodiments of the present disclosure, Example 13 provides a computer program product, where the computer program product upon being executed by a computer, causes the computer to implement the publishing method for the multimedia content according to any one of Examples 1-9.

In addition, while the plurality of operations have been described in a particular order, it shall not be construed as requiring that such operations are performed in the stated specific order or sequence. Under certain circumstances, multitasking and parallel processing may be advantageous. Similarly, while the plurality of specific implementation details are included in the above discussions, these shall not be construed as limitations to the present disclosure. Some features described in the context of a separate embodiment may also be combined in a single embodiment. Rather, the plurality of features described in the context of a single embodiment may also be implemented separately or in any appropriate sub-combination in a plurality of embodiments.

The invention claimed is:

1. A publishing method for multimedia content, comprising:

displaying a target multimedia content template on a display page;

in response to a copywriting display operation, displaying at least two preset copywritings corresponding to the target multimedia content template;

in response to a triggering operation on a target copywriting in the at least two preset copywritings, adding the target copywriting to the target multimedia content template; and in response to a publishing operation, generating target multimedia content using the target copywriting and publishing the target multimedia content.

2. The method according to claim 1, wherein the copywriting display operation comprises a virtual keyboard display operation, the displaying at least two preset copywritings corresponding to the target multimedia content template comprises:

displaying the virtual keyboard and a first preset copywriting corresponding to the target multimedia content template, wherein the first preset copywriting is a recommended copywriting.

3. The method according to claim 2, after the displaying the virtual keyboard and a first preset copywriting corresponding to the target multimedia content template, further comprising:

in response to a text input operation, displaying a target text input by a user; and performing at least one of: displaying a second preset copywriting matching the target text; and maintaining displaying the first preset copywriting corresponding to the target multimedia content template.

4. The method according to claim 1, wherein the copywriting display operation comprises a copywriting list display operation, the displaying at least two preset copywritings corresponding to the target multimedia content template comprises:

displaying a copywriting list of the target multimedia content template, wherein the copywriting list is used to display a third preset copywriting corresponding to the target multimedia content template.

5. The method according to claim 1, wherein the adding the target copywriting to the target multimedia content template comprises:

replacing an original copywriting added to the target multimedia content template using the target copywriting; or adding and displaying the target copywriting in the target multimedia content template and maintaining displaying the original copywriting added in the target multimedia content template, wherein the original copywriting comprises at least one of: a sample copywriting carried in the target multimedia content template; and a history copywriting added to the target multimedia content template by a user prior to a current moment.

6. The method according to claim 1, wherein identification information of a user is displayed in the target multimedia content template.

7. The method according to claim 6, wherein multimedia content information of the target multimedia content is further displayed in the target multimedia content template, and the method further comprises at least one of:

in response to a resizing operation for the identification information or the multimedia content information, synchronously adjusting a size of the identification information and a size of the multimedia content information; and in response to a position adjustment operation for the identification information or the multimedia content information, synchronously adjusting a display position of the identification information and a display position of the multimedia content information.

8. The method according to claim 1, further comprising:

acquiring target music matching the target multimedia content template, adding the target music to the target multimedia content template as background music of the target multimedia content, and displaying musical information of the target music.

9. The method according to claim 1, wherein the in response to a publishing operation, generating target multimedia content using the target copywriting and publishing the target multimedia content comprises:

in response to the publishing operation triggered on the display page, generating target multimedia content using the target copywriting and publishing the target multimedia content.

10. An electronic device, comprising:

at least one processor; and a memory, configured to store at least one program, wherein the at least one program, upon being executed by the at least one processor, causes the at least one processor to implement a publishing method for multimedia content, and the method comprises:

displaying a target multimedia content template on a display page;

in response to a copywriting display operation, displaying at least two preset copywritings corresponding to the target multimedia content template;

in response to a triggering operation on a target copywriting in the at least two preset copywritings, adding the target copywriting to the target multimedia content template; and in response to a publishing operation, generating target multimedia content using the target copywriting and publishing the target multimedia content.

11. The electronic device according to claim 10, wherein the copywriting display operation comprises a virtual keyboard display operation, the displaying at least two preset copywritings corresponding to the target multimedia content template comprises:

displaying the virtual keyboard and a first preset copywriting corresponding to the target multimedia content template, wherein the first preset copywriting is a recommended copywriting.

12. The electronic device according to claim 11, wherein after the displaying the virtual keyboard and a first preset copywriting corresponding to the target multimedia content template, the method further comprises:

in response to a text input operation, displaying a target text input by a user; and performing at least one of: displaying a second preset copywriting matching the target text; and maintaining displaying the first preset copywriting corresponding to the target multimedia content template.

13. The electronic device according to claim 10, wherein the copywriting display operation comprises a copywriting list display operation, the displaying at least two preset copywritings corresponding to the target multimedia content template comprises:

displaying a copywriting list of the target multimedia content template, wherein the copywriting list is used to display a third preset copywriting corresponding to the target multimedia content template.

14. The electronic device according to claim 10, wherein the adding the target copywriting to the target multimedia content template comprises:

replacing an original copywriting added to the target multimedia content template using the target copywriting; or adding and displaying the target copywriting in the target multimedia content template and maintaining displaying the original copywriting added in the target multimedia content template, wherein the original copywriting comprises at least one of: a sample copywriting carried in the target multimedia content template; and a history copywriting added to the target multimedia content template by a user prior to a current moment.

15. The electronic device according to claim 10, wherein identification information of a user is displayed in the target multimedia content template.

16. The electronic device according to claim 15, wherein multimedia content information of the target multimedia content is further displayed in the target multimedia content template, and the method further comprises at least one of:

in response to a resizing operation for the identification information or the multimedia content information, synchronously adjusting a size of the identification information and a size of the multimedia content information; and in response to a position adjustment operation for the identification information or the multimedia content information, synchronously adjusting a display position of the identification information and a display position of the multimedia content information.

17. The electronic device according to claim 10, wherein the method further comprises:

acquiring target music matching the target multimedia content template, adding the target music to the target multimedia content template as background music of the target multimedia content, and displaying musical information of the target music.

18. The electronic device according to claim 10, wherein the in response to a publishing operation, generating target multimedia content using the target copywriting and publishing the target multimedia content comprises:

in response to the publishing operation triggered on the display page, generating target multimedia content using the target copywriting and publishing the target multimedia content.

19. A non-transitory computer-readable storage medium, storing computer programs, wherein the computer programs, upon being executed by a processor, implement a publishing method for multimedia content, and the method comprises:

displaying a target multimedia content template on a display page;

in response to a copywriting display operation, displaying at least two preset copywritings corresponding to the target multimedia content template;

in response to a triggering operation on a target copywriting in the at least two preset copywritings, adding the target copywriting to the target multimedia content template; and in response to a publishing operation, generating target multimedia content using the target copywriting and publishing the target multimedia content.

* * * * *